United States Patent [19]

Miner et al.

[11] Patent Number: 4,777,621
[45] Date of Patent: Oct. 11, 1988

[54] VIDEO GAME AND PERSONAL COMPUTER

[75] Inventors: Jay G. Miner, Mountain View; Joseph C. Decuir, Albany; Ronald H. Nicholson, Sunnyvale, all of Calif.

[73] Assignee: Commodore-Amiga, Inc., Los Gatos, Calif.

[21] Appl. No.: 756,910

[22] Filed: Jul. 19, 1985

[51] Int. Cl.⁴ .............................................. G06F 9/00
[52] U.S. Cl. .................................................. 364/900
[58] Field of Search ............... 364/200, 900; 340/703, 340/704, 700, 701

[56] References Cited

U.S. PATENT DOCUMENTS

| | | | |
|---|---|---|---|
| 4,204,208 | 5/1980 | McCarthy | 364/900 |
| 4,243,984 | 1/1981 | Ackley et al. | 340/703 |
| 4,301,503 | 11/1981 | Frederiksen | 364/200 |
| 4,471,465 | 9/1984 | Mayer et al. | 364/900 |
| 4,513,390 | 4/1985 | Walter et al. | 364/900 |
| 4,571,456 | 2/1986 | Paulsen et al. | 340/700 |
| 4,591,975 | 5/1986 | Wade et al. | 364/200 |

Primary Examiner—Gareth D. Shaw
Assistant Examiner—John G. Mills
Attorney, Agent, or Firm—Finnegan, Henderson, Farabow, Garrett & Dunner

[57] ABSTRACT

A video game home computer is implemented in NMOS (n type metal oxide semiconductor) technology with plural microprocessors. Centralized bus architecture and direct memory access (DMA) techniques are employed. A video display generator provides color signal outputs to drive a commercial television receiver display. This display generator receives inputs from both microprocessors and obtains data directly from memory. A bit map of display information is kept in memory, wherein bits of information in memory image the precise screen display for each instance in time. A bit map manipulator circuit performs, under microprocessor direction, logic function manipulation of the bit map data. Access between system components is accomplished via the bus architecture on a priority queue basis. Chip count and chip area is minimized.

6 Claims, 3 Drawing Sheets

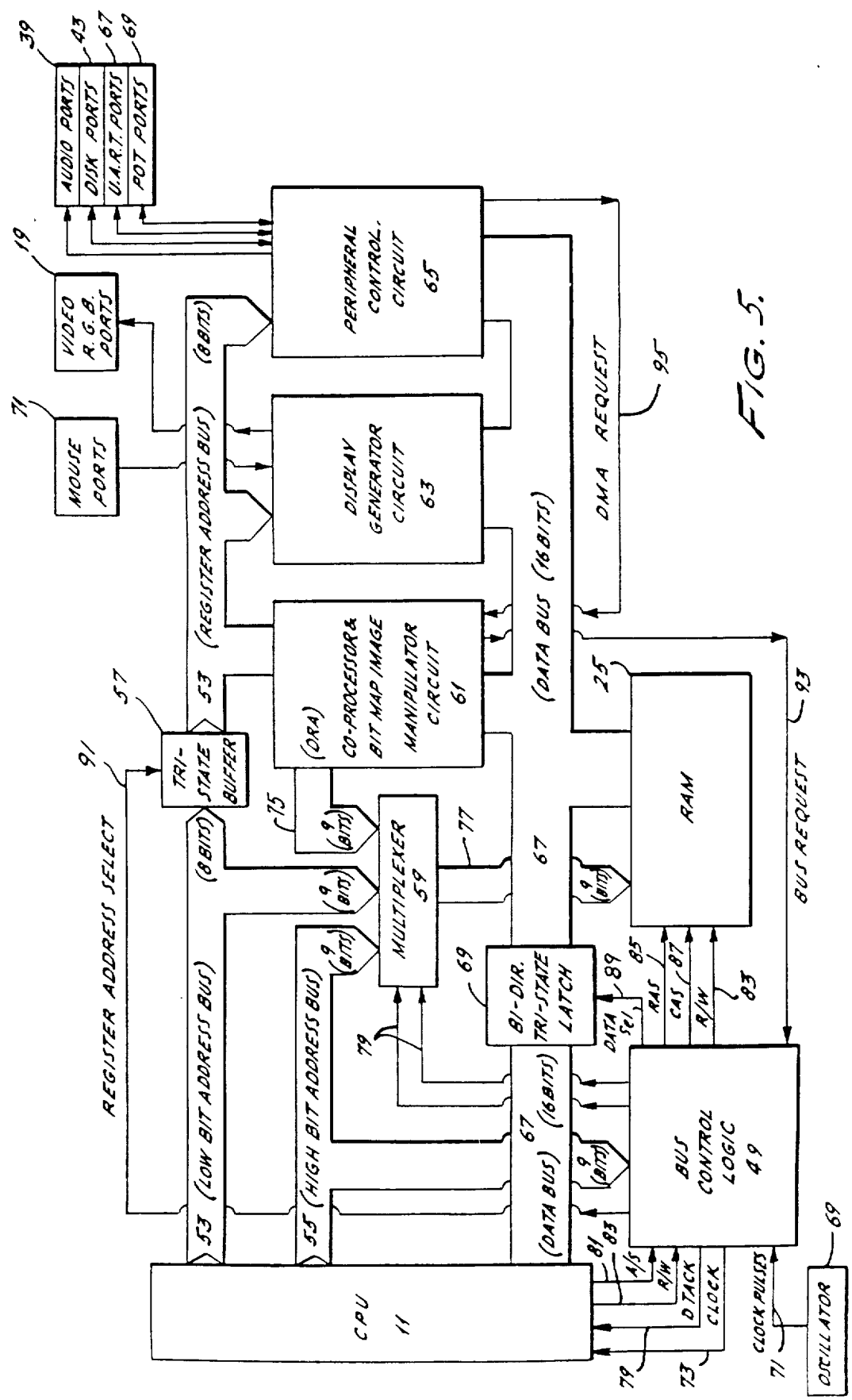

VIDEO GAME AND PERSONAL COMPUTER

BACKGROUND OF THE INVENTION

This invention relates to the field of microprocessor powered computers for video games and personal computing. The invention further relates to MOS (metal oxide semiconductor) technology, where circuit implementation is provided with chip area, i.e. chip size as a consideration. The invention also relates to a television digital display systems where one video bit of information is stored in memory for every element location of the picture (pixel), i.e. bit mapping.

Bit mapping, while space and time implementation consuming, is a straight forward and an accurate method for video display generation. Complex displays provided by video games and personal computers require overlay presentations of movable and/or changable information and of fixed information; and of collisions between movable objects. Bit map implementation has been the focus of various prior circuits.

Prior video game circuits have provided a complex display format to a television receiver display unit (a cathode ray tube), which display unit generates the presentation with a plurality of horizontal scans or raster lines. A video game circuit which is capable of displaying fixed objects as background as well as, moving objects is shown by Rosenthal, U.S. Pat. No. 4,053,740.

Rosenthal has built a special purpose digital computer to generate video game information from a plurality of selected, on a mutually exclusive basis, software defined programs. Operator commands are received and processed. Rosenthal's special purpose computer is separated into an independent computational section and an independent display section.

Dash et al, U.S. Pat. No. 4,034,983, show a video game circuit which receives operator commands from joy sticks (pots) and which generates and stores bit map information bearing a time-phase relationship to a television receiver raster-scan beam, which television receiver is being driven by the Dash circuit. Dash utilizes an analog mapping circuit connected to joy stick ports (pot ports), and a digital mapping circuit, to reset the television receiver raster-scan beam at appropriate times and to control display intensity thereby producing the game video display components.

Personal computers, such as the Apple Computer, have utilized a main microprocessor to perform computational operations and to process (retrieve) video display information to generate similar type displays as Dash to a television receiver.

The Apple Computer has incorporated a general purpose microprocessor, the MOS Technology Inc., Model 6502, to perform both computational operations and video display information retrieval. Such a single microprocessor driven system has speed limitations, as most microprocessors, including the 6502 have significant processing dead time used for refreshing registers and resetting and initializing operations. As a result, information processing in such systems can be slow.

One approach to increasing the speed of such a personal computer has been to utilize two processors. Cromenco Inc., has sold a personal computer containing two processors; a Motorola Inc., 68000 and a 6502. In this system, the first processor is dedicated to computational operations and the second microprocessor is dedicated to video display information retrieval.

Sukonick, U.S. Pat. No. 4,070,710, likewise, shows a two processor system. Sukonick has added a display system 16 to his programmed host computer 10. This video display system 16 contains an Intel Corporation 8088 microprocessor 76 within the micro control unit 22 of the video display system.

Along this line Burson, U.S. Pat. No. 4,180,805, has provided a video display circuit which incorporates a general purpose microprocessor 15, the TMS 1100 microcomputer, as shown in U.S. Pat. No. 3,988,604. A character memory is provided separate from a display memory. A display image is developed by the microcomputer and stored in the display memory where each display memory word is partitioned into two bytes, with the first of which being a character memory address and the second of which being a subaddress to locate a character-word within a set of character words in memory. Each character memory word is likewise partitioned into two bytes with the first byte determining color and the second byte selecting a particular character from a prestored set.

The use of a second general purpose commercially available microcomputer to process video display information, while increasing the system speed, also increases the cost of manufacture for the system. Further, it necessitates off-chip wire connections as each commercial circuit comes as a separate dual-in-line package (DIP). In LSI (large scale integration) circuit design this increases total system size, increases backplane and circuit card costs and increases the likelihood of noise pickup often necessitating additional filtering and increased signal levels, which usually leads to more power consumption.

Others have taken a divergent and different approach, such as using a display generator circuit designed as a raster scan line buffer structure. In such an approach, a general microprocessor can be used to address display object storage random access memory (RAM). The circuitry divides the display into moving objects (sprites) and into stationary playfield objects.

One specific design is shown by Hogan et al, U.S. Pat. No. 3,996,585, where a display generator is implemented with a plurality of buffer registers. He uses this display generator to process bit map information obtained from random access memory (RAM). A pattern generator is used to decode order data for each rastor scan line. Decoded rastor line data is stored in a buffer register for display. The pattern generator also decodes control data to determine collisions. The decoded collision control data is stored in a buffer register. Hogan's circuit is intended to relieve the system microprocessor from simple video display data retrieval and manipulation.

The Hogan circuitry is a departure from the two microprocessor approach of Sukonick; and a departure from the general purpose microprocessor driven display generators of Burson and Stubben et al. Hogan provides a special purpose circuit which can be implemented in LSI circuitry. It eliminates the cost of the second general purpose microprocessor and the card or board connection wiring thereto. Hogan's et al circuit, however, does require more memory including a large number of temporary storage registers.

In keeping with the display generator circuit approach of Hogan et al, others have built a decoder based video display generators. Such a circuit would not utilize a second general purpose microprocessor to drive a video generator, but may use display instruction decoder circuits to provide movable object and stationary playfield object information to the video display, thereby reducing the work on the only (general purpose) microprocessor present without the use of a second microprocessor. Any of these circuits, as with Hogan et al, require an increase in memory or storage space which is satisfied by a large number of registers. Some video display generators have their circuitry divided into a decoder(s), a RAM(s) and a register(s) for handling playfield fixed object data and into a decoder-selectors and registers for handling moving object data.

It is desirable to provide complex video presentations on a television receiver using less circuitry than these previous devices, and to provide faster processing circuitry more cheaply. Further it is desirable to define, in a new way, the video display data, so that it can be processed and combined complex video presentations using less expensive circuit structure.

SUMMARY OF THE INVENTION

An object of the present invention is to provide a video game home computer which incorporates direct memory access (DMA) and increases the duty cycle of the bus architecture thereby decreasing dead time and increasing processing rates for the system.

A second object of the invention is to provide a system implemented with a main general purpose microprocessor and a general purpose co-processor capable of processing video display information and implemented in LSI circuitry germane to the rest of the system circuitry.

A third object of the invention is to provide a system implemented with very few LSI chips thereby reducing interchip wiring.

A fourth object of the invention is to assign chip geometry to limit chip size to the more economical 48 pin package size and with chip size in the 250–270 mil. range.

The objects of this invention are realized in a personal computer system capable of driving a commercial television receiver to provide a complex display of the type desirable for video games, visual arts and other types of presentations.

A general purpose microprocessor is connected to a bus architecture. Random access memory (RAM) is likewise connected to this bus architecture, as well as, are three custom LSI circuit chips providing other principal functions of the system. The bus architecture includes controllable gates for directing access as between the above-described major components according to priority selection and bus access control logic. A direct memory access (DMA) scheme is implemented.

The three custom circuit chips contain audio circuitry, disk controller circuitry, bus interrupt priority logic, pot port circuitry, mouse port circuitry, universal assyncronous transmission and receive (UART) port circuitry, display generator circuitry, display bit map image manipulation circuitry and a general purpose microprocessor (co-processor) having a limited instruction set.

The first mentioned general purpose microprocessor is implemented on a DIP chip and has the ability to access audio, disk controller, display generator and bit map manipulator circuitry and system (RAM) memory, as well as, does the co-processor have this ability to access this circuitry and memory.

DESCRIPTION OF THE DRAWINGS

The structure, operating features an advantage of the present invention will become apparent from a reading of the following detailed description of the invention in connection with the accompanying drawings in which like numerals refer to like elements and in which:

FIG. 5 is a system chip diagram of the present invention of FIG. 4.

DETAILED DESCRIPTION OF THE INVENTION

The present invention provides an improved personal computer capable of generating more complex video presentations on a television receiver type display. The system accomplishes this task using less circuitry (i.e. chip real estate), and with faster processing than often found in microprocessor driven systems. Direct memory access and bit map image schemes are implemented using a commercially available microprocessor and a LSI ciruit implemented co-processor having a limited instruction set, thereby saving unnecessary chip real estate for the co-processor and thereby has the ability to service the principal subsystem circuits in the computer system, as does the main microprocessor. A central bus architecture has queue and priority access; and timing and control logic manages to enhance the duty cycle of this bus architecture.

Figure 1:
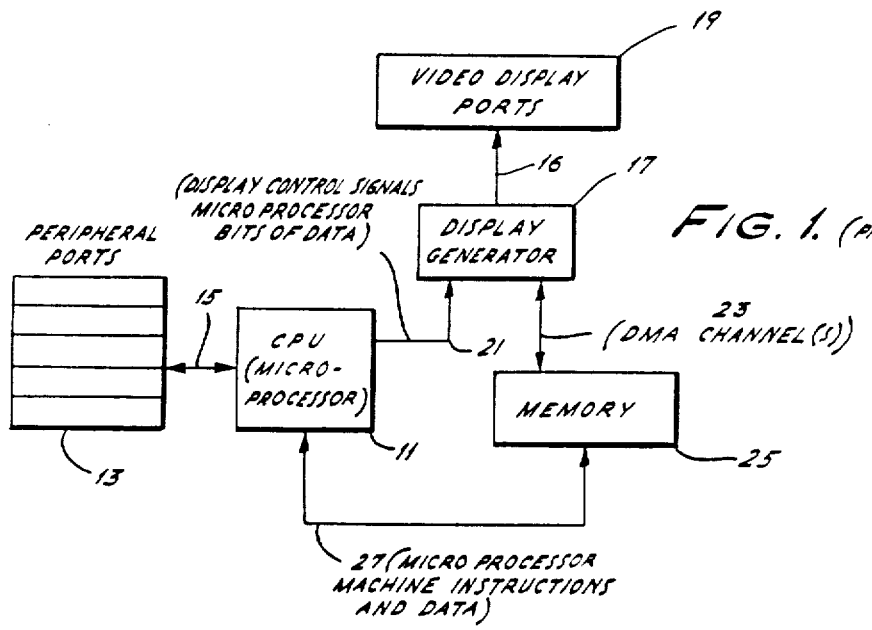
FIG. 1 is a block diagram illustrating a prior art personal computer system in which a single general purpose microprocessor was used to perform computation operations and display functions.

FIG. 1 shows the basic circuitry for a single microprocessor based personal computer. This prior art system has a microprocessor 11 central processing unit (CPU) which receives and transmits information to a plurality of peripheral equipment ports 13 via wiring 15. A display generator 17, either being software loaded or hard wired, provides red, green and blue (R.G.B.) video drive signals to the ports for a video display 19 via connection 16. A standard television receiver (not shown), being set up to operate according to either U.S. (NTSC), or European (PAL) or R.G.B. (red, green, blue) standards can also be connected to the ports.

The microprocessor 11 sends display control signals in the form of microprocessor bits of data 21 to drive the display generator 17. DMA channels 23 are used to fetch and write video display words to the display generator 17 from system memory 25. A bus 27 connects the microprocessor 11 and the memory 25 for fetching and writing machine instructions and data words.

There have been several attempts in the past to increase system processing speed without increasing circuitry size considerably and without upgrading the microprocessor 11 with a much more expensive processor. These have taken the form of attempts in the past to build specific special purpose hardware dedicated to producing video data and thereby relieve the microprocessor of time consuming functions.

Figure 2:
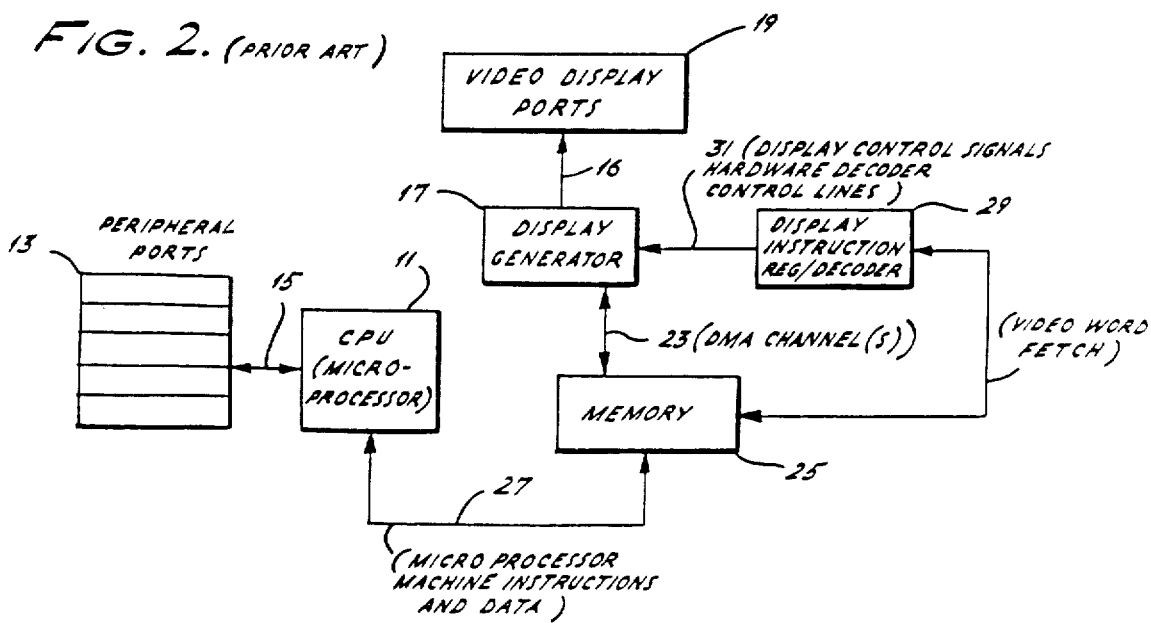
FIG. 2 is a block diagram illustrating a prior art personal computer system in which a display instruction decoder circuit was incorporated to relieve the single general purpose microprocessor of some of the display functions.

FIG. 2 shows one such prior attempt. Here, the microprocessor 11 communicates 15 with the peripheral equipment ports 13 and fetches and writes machine instruction and data words via bus 27 to and from the memory 25. A display generator 17 is connected via DMA channels 23 to the memory 25.

As in the system of FIG. 1, the display generator 17 drives the video display ports 19. This system, FIG. 2, differs from the previous as a display instruction decoder and register circuitry 29 is hard wired to provide display control signals as decoder control line outputs 31 to the display generator 17. This eliminates the need for microprocessor direct communication to the display generator 17 and data bits being sent from the microprocessor 11 to the display generator 17.

Video display words defining the composite signal to be sent to the display ports 19 are transferred from memory 25 to the decoder circuitry 29. These words are not microprocessor instructions.

The limitations of this previous system, FIG. 2, include the use of a lot of circuitry (chip real estate) for the special purpose of display code word fetch and decode without this circuitry being usable for other functions.

Figure 3:
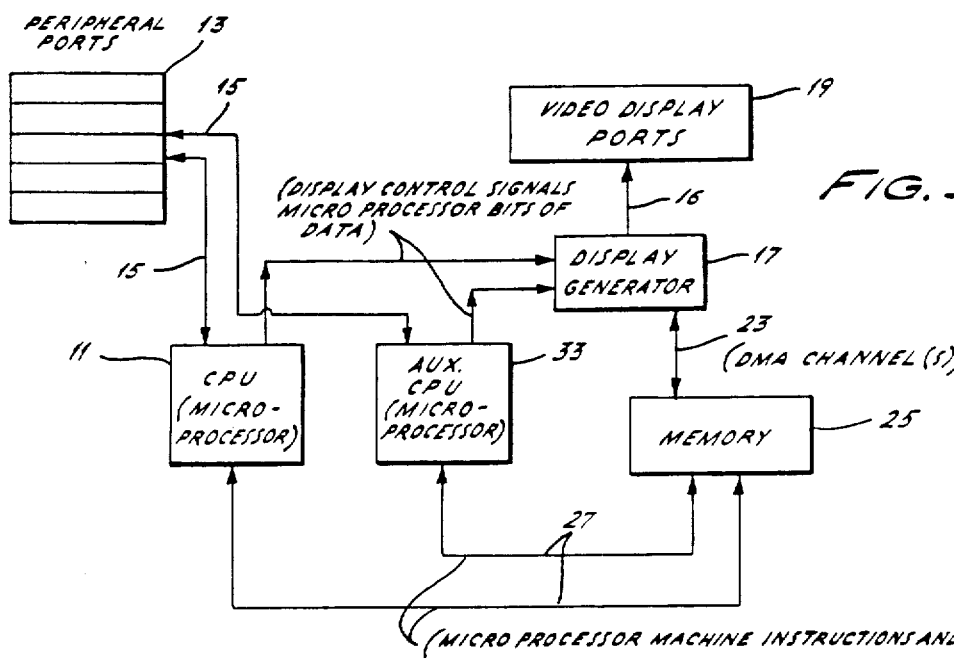
FIG. 3 is a block diagram illustrating a prior art personal computer system in which a second or auxiliary microprocessor was included to assist the main or first microprocessor including performing display functions.

A third prior system design, FIG. 3, incorporates a second or auxiliary general purpose microprocessor 33 in addition to a first microprocessor 11, and overcomes the limitations of the circuit of FIG. 2.

This third system, FIG. 3, duplicates the circuitry of the first system, FIG. 1, including microprocessor 11, plural peripheral equipment ports 13, display generator 17, memory 25, DMA channels 23 and video display RGB ports 19. This, FIG. 3, system, however, has a redundant microprocessor 33, and redundant connections 15 to the peripheral ports 13, bus connections 27 to the memory 25 and display control signals being microprocessor data bits 21 to the display generator 17.

Both microprocessors 11, 33 are commercial units on DIP chips. If the auxiliary microprocessor 33 is the same model as the first microprocessor 11 the costs for the system processors is double that of the first system, FIG. 1.

Figure 4:
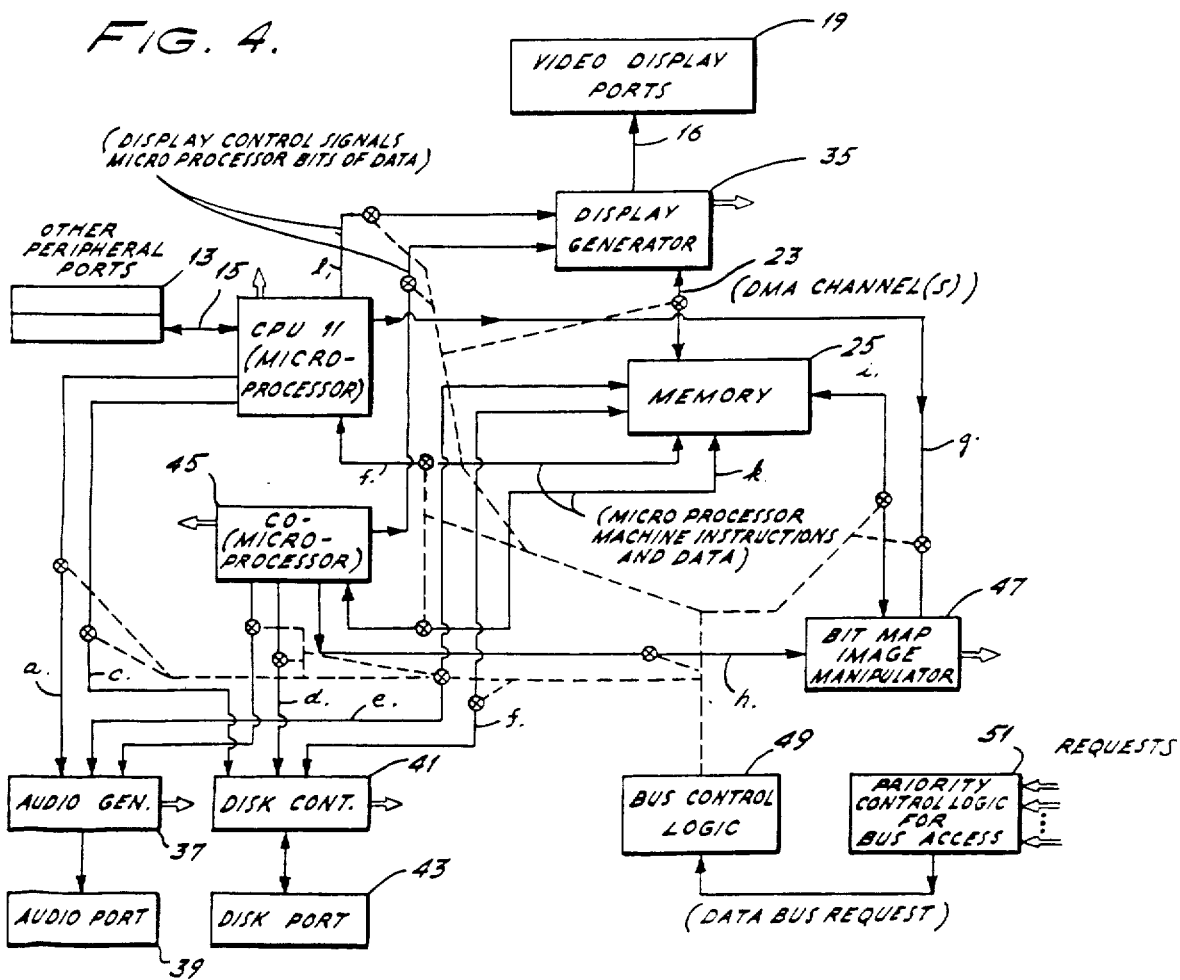
FIG. 4 is a block diagram illustrating the principal components and functional interconnection of the present invention.

The present invention, FIG. 4, includes a commercial microprocessor 11 which can be implemented with a Motorola Corporation Inc. Model 68000 microprocessor. The microprocessor 11 is connected via connection 15 to a limited number of peripheral equipment ports 13. The system includes a memory 25 which is a random access memory (RAM) being 128 to 512k bytes in size. DMA channels 23 connect a display generator 35 to the memory 25. The display generator 35 is used to drive the video display ports 19.

An audio generator circuit 37 drives an audio port 39 and a disk controller circuitry 41 communicates with a disk port 43.

The invention includes a second microprocessor 45. This second microprocessor 45 designed to be a general purpose microprocessor, but with an instruction set smaller than the first microprocessor 11. This second microprocessor is known as the co-processor 45 and includes general purpose hard wired instructions including the following: (wait until), (move data), (skip if) and (jump).

The invention includes a bus architecture and utilizes direct memory access (DMA) technique. This technique utilizes a shared address bus and a shared data bus where the memory 25 shares access to the information bus with bus time being arbitrated between various subsystem components.

The invention operates in the bit map mode of operation. Every position on the screen for every time instance of display is mapped by a code bit in a corresponding relationship in the memory 25. To generate the display this bit map of data words is transferred to the display generator 35 from memory 25. To change an object on the screen, data representing that object is moved to a new location in memory.

A bit map image manipulator circuit 47 is designed to perform certain logical operations such as a logical AND, OR, EXCLUSIVE OR and SHIFT functions on the map play data in memory 25. This manipulation reconfigures the data for the continuing display.

A bus architecture is used to transfer both instruction words and data. All of the system components such as the microprocessor 11, co-processor 45, memory 25, display generator 35, audio generator 37, disk controller 41 and bit map manipulator circuit 47 are connected to this bus architecture. A bus control logic circuit 49 controls access to the bus architecture as between all of these components. This bus control logic 49 is fed bus request signals from a priority control logic for bus access 51. This priority control logic for bus access 51 receives priority requests from the microprocessor 11, co-processor 45, display generator 35, bit map image manipulator circuitry 47, audio generator 37 and disk controller 41. The bus control logic 49 thereby controls the following signal transfers in addition to access to DMA channels 23:

a. Control signals from the microprocessor 11 to the audio generator 37, b. Control signals from the co-processor to the audio generator 37, c. Control signals from the microprocessor 11 to the disk controller 41, d. Control signals from the co-processor 45 to the disk controller 41, e. Transfer of DMA data to the audio generator 37 from memory 25, f. Control of DMA data back and forth between the disk buffers 41 and memory 25, g. Control of information to the bit map image manipulator circuitry 47 from the microprocessor 11, h. Control of information to the bit map image manipulator circuitry 47 from the co-processor 45.

i. Control of DMA data back and forth between the bit map image manipulator circuitry 47 and memory 25, j. Control of machine instructions and data between the microprocessor 11 and memory 25, k. Control of machine instructions and data between the co-processor 45 and memory 25, l. Control of display control signals in the form of microprocessor bits of data from the microprocessor 11 to the display generator 35, and m. Control of display control signals in the form of microprocessor bits of the data from the co-processor 45 to the display generator 35.

The invention of FIG. 4 is configured according to chip architecture shown in FIG. 5. The Motorola 68000 microprocessor 11 communicates an address bus, half 53 of which is used to transmit the nine least significant bits of an address word from the microprocessor 11, while the second half of which, bus 55 transmits the nine most significant bits of the address word from the microprocessor 11. The lower half address bus 53 also feeds the least significant eight bits of the address word carried thereon to a tri-state buffer circuit 57, and to a multiplexer circuit 59. The high half of the address bus 55 feeds the nine highest bits of the address word from the microprocessor 11 to the multiplexer 59 and to bus control logic circuitry 49.

Tri-state buffer 57 selectively gates the eight lowest bits on the low bit address bus 53 through to address the three custom LSI chips 61, 63, 65 implemented in 48 pin NMOS technology packages. The first of these chips 61 houses the co-processor 45 circuitry, as well as, the bit map image manipulation circuitry 47 of FIG. 4. The second custom chip 63 contains the display generator circuitry 35, while the third custom chip 65 contains the peripheral control circuitry including the audio generator circuitry 37, disk controller circuitry 41 and other peripheral port circuitry 13.

Circuitry contained on each custom chip 61, 63, and 65 will be further discussed below. Access between the register address bus 53 and the first custom chip 61 is bi-directional, while access from the register address bus 53 is unidirectional into the display generator circuit custom chip 63 and peripheral control circuit custom chip 65. The peripheral control custom chip 65 transmits audio signals to the audio ports 39 and has bi-directional transmission signals between the disk ports 43.

The other ports 13 of FIG. 4 include a UART port 67 and a pot port 69. Signal transmission between these ports 67, 69 and the peripheral control custom chip 65 is bi-directional. Another peripheral port considered amongst the group 13, FIG. 4, is a mouse port 71 which sends signals to the second custom chip 63. The video ports 19 are connected to receive signals from this second custom chip 63.

Housed on the first custom chip 61 is the priority control logic for bus access 51, the co-processor 45, the bit map image manipulation circuitry 47 and the vertical position controller for movable objects (sprites), this vertical position controller is a classical section of the first chip 61. Also housed on this custom chip are address registers for the DMA channels 23.

The display generator 35 is implemented on the second custom chip 63 and includes the bit plane buffer registers for generating a plurality of multiple playfields of fixed objects. The video color selection registers and a display priority controller which determines collision priority of display between fixed and movable (sprite) objects are also on this chip 63. The display generator 35 also includes a sprite horizontal position controller having horizontal position registers and a plurality of sprite data buffers connected to said horizontal position controller.

Also housed on this second custom chip 63 is a collision detection circuitry for detecting collisions between fixed and moving objects, and also mouse port counters.

Housed on the third custom chip 65 are four audio generator circuits, a disk controller circuit, a UART communications circuit and pot port circuits.

The above circuitry placed on the custom chips 61, 63 and 65 may be implemented in a number of classical ways previously practiced in the art.

The microprocessor 11 is capable of internal calculation of information in 32 bit words. The microprocessor 11, however, has a sixteen bit word data bus connection. This data bus connection is bi-directional between the microprocessor 11 and a sixteen bit data bus 67. A bi-directional tri-state latch 69 operates as a gate between the microprocessor 11 and the data inputs of the first custom chip 61, the second custom chip 63 and the third custom chip 65, as well as, the input to RAM 25. These three custom chips, 61, 63 and 65, as well as, the RAM 25 all have bi-directional connections to the data bus 67.

The basic system clock drives an oscilator circuit 69 which feeds clock pulses 71 to the bus control logic 49. Clock pulses 73 are then sent to the microprocessor 11 from the bus control logic 49.

The first custom chip 61 generates a 18 bit dynamic RAM address multiplexed onto a nine bit bus 75 which is connected into the multiplexer 59. Multiplexer 59 selects amongst the nine bits supplied by each of the buses 53, 55 and 75 to pass on a time share basis each individual address (nine bit) word to address the RAM 25 via a bus connection 77.

A two bit control line 79 comprises two wires from the bus control logic 49 to control the state of the multiplexer 59. These control lines will select the high 9 bit address bus 55, and then the low 9 bit address bus 53 to make up 18 address bits from the microprocessor 11. Otherwise, they select the dynamic RAM address bus 75 from the first custom chip 61, with 18 bits from chip 61 (9 bits at a time).

The microprocessor 11 has a DTACK input which serves to tell the microprocessor 11 that it has access to the data bus 67. This DTACK signal is passed from the bus control logic 49 to the microprocessor 11 on the DTACK line 79. An additional connection 81 exists between the microprocessor 11 and the bus control logic 49 as an address strobe signal 81. Another line 83 carries a read- write request 83 from the microprocessor 11 to the bus control logic 49.

When the microprocessor 11 has been granted access to the RAM 25, via the bus 53, 55, 67, the read- write signal 83 is passed via a separate line 83 from the bus control logic 49 to the RAM 25.

A "row address strobe" signal 85 and a "column address strobe" signal 87 provide additional control inputs to the RAM 25 from the bus control logic 49. A data source select line 89 provides a control to the bi-directional tri-state latch 69 from the bus control logic 49. A register address select line 91 provides a control line input to the tri-state buffer 57 from the bus control logic 49.

A bus request line 93 from the first custom chip 61 inputs requests for bus access from the circuitry on that chip 61 to the bus control logic 49. A DMA request line 95 provides bus access requests from the circuitry the third custom chip 65 through the first custom chip 61 to the bus control logic 49.

The bi-directional tri-state latch 69 and tri-state buffer 57 are controlled to operate in unison by the bus control logic 49. This bus control logic 49 determines when the microprocessor 11 is on the data bus 67 and addresses from the microprocessor 11 should be passed through the tri-state buffer 57 as well as the multiplexer 59 to access RAM 25, as well as, the circuitry on the custom chip 61, 63 and 65.

The highest nine bits of the address from the microprocessor 11 are fed via the bus 55 to the bus control logic 49 where they are decoded to generate a register address select signal 91 to the tri-state buffer 57 to allow the address word to be passed to the three custom chips 61, 63 and 65 via register address bus 53. These eight lowest bits on bus 53 thereby select which register on the particular custom chip 61, 63 and 65 is to receive data from the data bus 67. This scheme saves pins and interconnection wiring including back plane wiring, card and board wiring, as well as, eliminates additional logic circuitry needed to select between the microprocessor 11 and a custom chip 61, 63 and 65 logic.

All of the custom chips receive data bus information at the same time and each custom chip 61, 63 and 65 contains an address decoder for each data register. When the proper address is received by that portion of the circuit, that particular register portion is selected and the data on the bus 67 is thereby enabled to be entered into that register. This implementation eliminates the need for additional decoders and additional lines into the chip. Each data register has a unique address. When an address is applied to the register address bus 53, that register is selected to receive data from the data bus 67. This permits inter-circuit communication using but a single address bus and eliminates interchip wiring and additional circuitry. By taking advantage of the microprocessor 11 dead time, the control logic 49 increases the signal and time of use of the bus 53, 55 and 67 architecture.

The bus system carries addresses which have both the source address and the destination address. With few exceptions, the dynamic RAM address (DRA word) from the first custom chip 61 is almost always a source address and the register address on bus 53 also generated by the first chip 61 almost always carries a destination register address for DMA data transferred on the data bus 67.

The structure for circuit input buffer registers and circuit output buffer registers is known in the art. This structure will not change regardless of whether the information being temporarily stored is data or addresses. The clocking of signals through such buffer registers is also known in the art. Their use and purpose in the present invention, however, departs from the prior art.

During DMA data transfer, the first custom chip 61 generates a register address (RGA signal) onto bus 53 which determines the destination for data and generates a dynamic RAM address (bus 75) which selects the location of source of data within the RAM 25.

During operation of the bit map image manipulator circuit the latter communicates bi-directionally with the memory to access bit map video image information to perform logical operations (e.g., AND, OR, SHIFT and EXCLUSIVE OR) thereon under control of control signals provided from the microprocessors. Such control signals are stored in the control registers in chip 61 which are loaded via the data bus in response to register address signals received on bus 53.

During display operations the display generator on chip 63 reacts to display the bit map video image stored in the memory 25 and supplied via data bus 67. This is done in response to control signals supplied via data bus 67 and stored in control registers in chip 63 in response to address information supplied on bus 53 by the CPU 11 or by the co-processor in chip 61.

The duty cycle on the data bus 67 is increased and controlled in part by the DTACK signal 79 and the address strobe signal 81. The specific operational characteristics of the microprocessor 11 allow this microprocessor 11 to make use of the data bus only about 50 percent of the time. So in the other time the custom chips 61, 63 and 65 make use of the data bus 67. This enables a greatly increased usage of the busing architecture and reduces the size of the wiring between chips and system geometry. Conflicts for access to the data bus 67 are resolved by priority logic resident on the first custom chip 61 and carried out according to the bus control logic 49. The co-processor 45 can be programmed to handle the video display functions which, in the system configuration of FIGS. 4 and 5, would otherwise be handled by microprocessor 11. Co-processor 45 being smaller than the microprocessor 11 is much less expensively implemented. By being on the same LSI circuit chip, wiring problems are greatly reduced.

The architecture described in connection with FIG. 5 enables the circuitry described in connection with FIG. 4 to be embodied on these custom LSI circuit chips 61, 63 and 65 each having a pin count below 48 pins, as well as the commercial microprocessor 11, the commercial RAM 25 and commercial tri-state buffer 57, multiplexer 59, bi-directional tri-state latch 69 and bus control logic 49.

The microprocessor as stated above as a Motorola Corporation 68000. The multiplexer 59 maybe implemented in TTL logic including a Fairchild Corporation, Model 74F374, octal latch and a Fairchild Corporation, Model 74F257, multiplexer being a two-to-one multiplexer with tri-state output. The tri-state buffer 57 can be implemented with a Texas Instruments, Model 74LS244, tri-state driver, while the bi-directional tri-state latch 69 can be implemented with a Texas Instruments, Model 74LS244, tri-state driver and a Model 74LS273 octal latch with tri-state outputs.

The RAM 25 can be implemented with a 256k memory such as an NEC Corporation, Model D41254D. Bus control logic circuitry 49 can be implemented with a MMI Corporation, Model 16L8 switching circuit along with a plurality of NAND gates and flip flops.

All of the above described circuitry, including the subsystem circuits which are shown in the prior art are intended to be interconnected in their usual manner.

The system, FIGS. 4-5, being the present invention, utilizes operator provided instructions in the form of software, which are loaded into RAM 25 when the system is booted-up. The software instruction set for the M68000, is incorporated. The peripheral prots 13, include a keyboard input for entering instructions in a standard manner.

The above description of the invention is intended to read as illustrative of the invention and is not to be considered as limiting the scope or intent. Changes can be made in the invention without departing from the intentive features and scope thereof.

What is claimed is:

1. A video game and personal computer operating under direct memory access (DMA) with an address bus shared between a main microprocessor and an auxiliary microprocessor, so that said microprocessors alternately supply addresses to said bus comprising:
 a main microprocessor;
 a memory;
 a data bus connected to said main microprocessor and to said memory;
 a data bus switch being capable of interrupting said data bus between said main microprocessor and said memory;
 a plurality of circuit chips connected on the same side of said data bus switch as said memory said chips each having a plurality of control registers in connection with said data bus for receiving data therefrom;
 a register address bus connected to said main microprocessor and to each of said plurality of circuit chips, each address carried thereon being operative to selectively enable said control registers on said chips;

a register address bus switch being capable of interrupting said register address bus between said main microprocessor and said chips;

wherein one of said chips contains an auxiliary (AUX) microprocessor, for controlling data display operations, said AUX microprocessor being capable of placing addresses on said register address bus when said register address bus switch interrupts the connection between said register address bus and said main microprocessor; and wherein said one of said chips contains a DMA address encoder circuit and a DMA address generator, said DMA address encoder being capable of placing register addresses on said register address bus when said register address bus switch has disconnected said register address bus from said main microprocessor.

2. The computer of claim 1 further including a memory address output bus connected to said one of said chips, said output bus transmitting DMA memory addresses produced by said DMA address generator to said memory when said register address bus is disconnected from said main microprocessor.

3. The computer of claim 2 further comprising a display generator included in another of said circuit chips for generating a data display output and a control circuit for operating said data bus switch for interrupting said data bus between said main microprocessor and said memory when said register address bus is disconnected from said main microprocessor, whereby data is placed on said data bus in response to said DMA memory addresses.

4. The computer of claim 3 wherein said DMA address generator produces first address data for reading display control information out of said memory onto said data bus and said DMA address encoder circuit produces register addresses for loading said display control information on said data bus into designated control registers in said other of said circuit chips.

5. The computer of claim 4 wherein said DMA address generator produces second address data for reading display information out of said memory onto said data bus, whereby said display generator utilizes said display information for generating said data display output.

6. A video game and personal computer operating under direct memory access (DMA) with a data bus being utilized on a shared basis between a main microprocessor and a memory data manipulator circuit so that said manipulator circuit is enabled to process display data comprising:

a main microprocessor;

a memory;

a data bus connected to said main microprocessor and to said memory;

a data bus switch for interrupting said data bus between said microprocessor and said memory;

a plurality of circuit chips connected to said data bus on the same side of said data bus switch as said memory, said chips each having a plurality of control registers connected to said data bus for receiving data therefrom;

a register address bus connected to said main microprocessor and to each of said plurality of circuit chips, each address carried thereon being operative to selectively enable said control registers on said chips;

a register address bus switch being capable of interrupting said register address bus between said main microprocessor and said chips;

an address multiplexer circuit for transmitting address data to said memory from a plurality of sources, including said main microprocessor;

a memory data manipulator circuit included within one of said circuit chips, said circuit including a DMA address generator for supplying DMA address data to said address multiplexer circuit; and a control circuit connected to said data bus switch, said register address bus switch and said address multiplexer circuit for connecting said main mmicroprocessor to said address bus to enable loading of the control registers of said one circuit chip and for thereafter disconnecting said data bus from main microprocessor and enabling said multiplexer circuit to supply DMA address data from said memory data manipulator circuit to said memory, whereby display data stored in said memory is read into said manipulator circuit via said data bus for processing by said data manipulator circuit in accordance with said data stored in said control registers of said one circuit chip.

* * * * *